(12) United States Patent
Clark (10) Patent No.: US 11,121,625 B2
(45) Date of Patent: Sep. 14, 2021

(54) VOLTAGE DOUBLER USING A SWITCHING REGULATOR AND VOLTAGE LIMITER

(71) Applicant: InterDigital CE Patent Holdings, SAS, Paris (FR)

(72) Inventor: Joseph Clark, Buford, GA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/638,024

(22) PCT Filed: Aug. 13, 2018

(86) PCT No.: PCT/US2018/046507
§ 371 (c)(1),
(2) Date: Feb. 10, 2020

(87) PCT Pub. No.: WO2019/036368
PCT Pub. Date: Feb. 21, 2019

(65) Prior Publication Data
US 2020/0220458 A1 Jul. 9, 2020

Related U.S. Application Data (60) Provisional application No. 62/545,208, filed on Aug. 14, 2017.

(51) Int. Cl.
*H02M 3/158* (2006.01)
*H02M 3/07* (2006.01)
(Continued)

(52) U.S. Cl.
CPC ......... *H02M 3/073* (2013.01); *H02M 1/0095* (2021.05); *H02M 1/348* (2021.05); *H02M 3/158* (2013.01)

(58) Field of Classification Search
CPC ..... H02M 3/155–1588; H02M 1/0095; H02M 1/348; H09M 3/07–2003/078
See application file for complete search history.

(56) References Cited

U.S. PATENT DOCUMENTS 6,756,772 B2 6/2004 Mcginnis
6,776,772 B1 8/2004 Vrijer et al.
(Continued)

FOREIGN PATENT DOCUMENTS

CN 101252802 A 8/2008
CN 205319941 U 6/2016

OTHER PUBLICATIONS

Hwu K. I., et al., "A Novel Buck Boost Converter Combining KY and Buck Converters", IEEE Transactions on Power Electronics, Institute of Electrical and Electronic Engineers, USA, vol. 27, No. 5, May 1, 2012, pp. 2236-2241, XP01143910.
(Continued)

*Primary Examiner* — Peter M Novak
(74) *Attorney, Agent, or Firm* — Jerome G. Schaefer (57) ABSTRACT

A voltage doubler circuit configuration includes a switching regulator having a variable input voltage and a regulated voltage, and a voltage doubler circuit that utilizes the regulated voltage of the switching regulator. The voltage doubler circuit includes an output capacitor that receives an elevated voltage from a voltage doubler capacitor and an electrical clamp that limits the voltage doubler capacitor from exceeding the regulated voltage. The output voltage is twice the regulated voltage minus circuit losses.

9 Claims, 6 Drawing Sheets

(51) Int. Cl.
*H02M 1/00*     (2006.01)
*H02M 1/34*     (2007.01)

(56)     References Cited

U.S. PATENT DOCUMENTS

| | | | |
|---|---|---|---|
| 7,545,658 B2 | 6/2009 | Thiele et al. | |
| 8,058,861 B2 * | 11/2011 | Pelrine | H01L 41/042 323/288 |
| 2011/0006700 A1 | 1/2011 | Chen et al. | |
| 2014/0111113 A1 * | 4/2014 | Del Carmen, Jr. | H02M 3/158 315/297 |

OTHER PUBLICATIONS

Greeshma, Joseph, et al., "Analysis and comparison of inductor couple buck-boost converter combining KY converter and SR buck converter", 2014 International Conference on Circuits, Power and Computing Technologies [ICCPCT-2014], IEEE, Mar. 20, 2014, pp. 254-259, XP023743577.
CN205319941 English Language Abstract.
Newly-Constructed Bidirectional DC/DC Converter Topology with High Voltage Conversion Ratio for Vehicle to DC-Microgrid (V2DCG) System.
Neba et al., Switch-mode voltage-doubler rectifier with symmetrical arrangement of capacitors for pumping action, IEE Proc.-Electr. vol. 152, No. 2, Mar. 2005.
Sengolan et al., IEEE High Voltage Gain Step-up/down Converter with Voltage Doubler for Non-Linear Loads, 2014, 5 pages.

\* cited by examiner

VOLTAGE DOUBLER USING A SWITCHING REGULATOR AND VOLTAGE LIMITER

CROSS-REFERENCE TO RELATED APPLICATIONS

This application is the National Stage entry under 35 U.S.C. § 371 of Patent Cooperation Treaty Application PCT/US2018/46507, filed 13 Aug. 2018, which claims the benefit of U.S. Provisional Patent Application No. 62/545,208, filed 14 Aug. 2017, the entire contents of which are hereby incorporated by reference as if fully set forth herein, for all purposes.

FIELD

The present principles relate to electrical circuits, specifically, they relate to a voltage doubler circuit.

BACKGROUND

Traditional voltage doubler circuits have an output voltage that is variable based on the input voltage If the input voltage varies, so does the doubled output voltage Some applications of a voltage doubler require a more consistent output voltage to negate variations in input voltage. U.S. Pat. No. 6,756,772 teaches a dual-output direct current voltage converter having a charge pump circuit in conjunction with a switching power converter However, the output voltage of the charge pump circuit is still dependent on the value of the input voltage If the input voltage varies, so does the charge pumped voltage output. A voltage doubler circuit that is less reliant on input voltage variations is desired.

Figure 1:
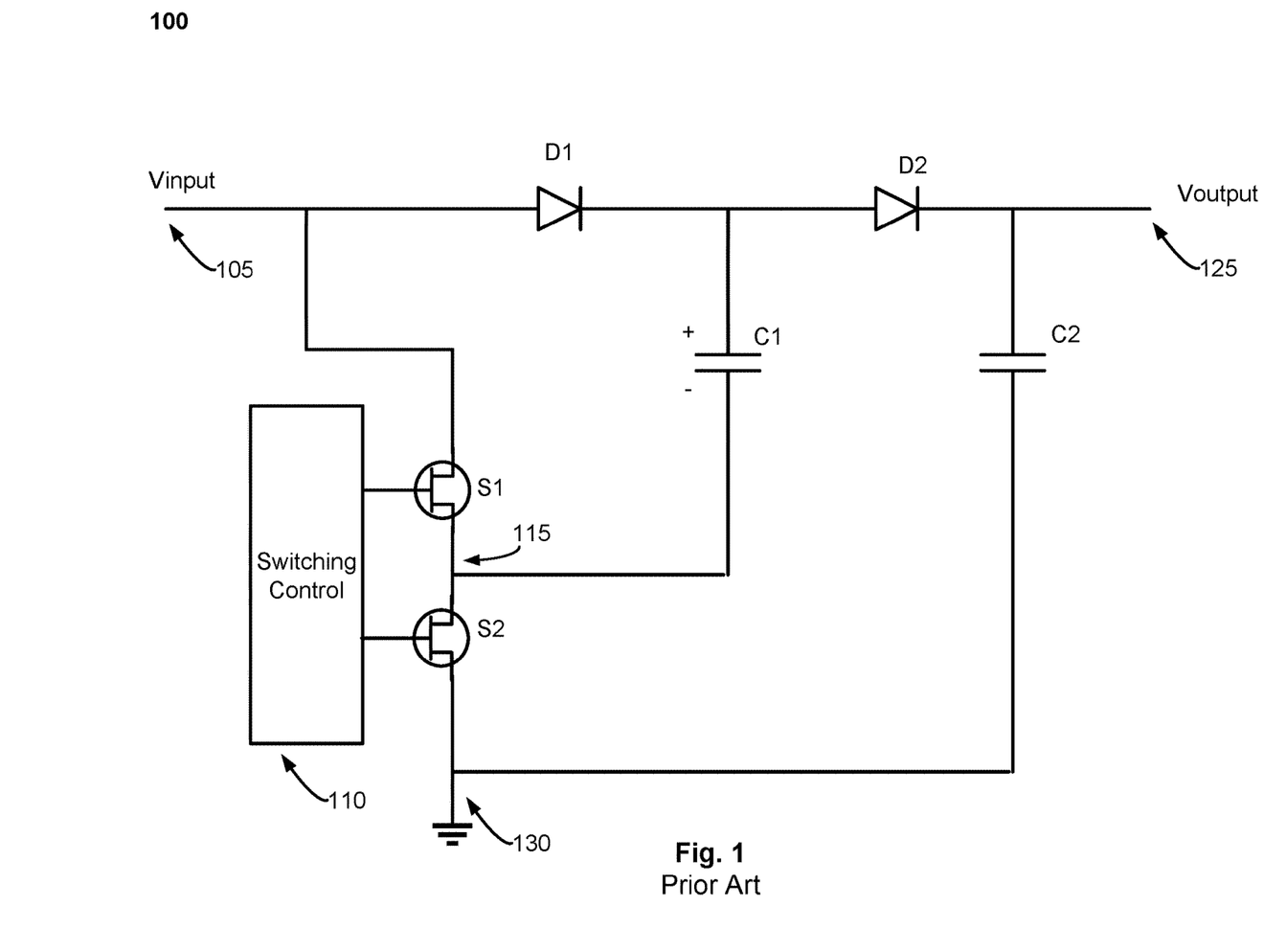
FIG. 1 is a typical voltage doubler circuit topology.

FIG. 1 depicts a traditional charge pump voltage doubler configuration 100. A switching control circuit 110 controls the switching on and off of switches S1 and S2. The switches S1 and S2 are shown as generic field effect transistors (FET) in FIG. 1, but can be any suitable switching element technologies, such as MOSFETs, UJTs, Bipolar transistors and the like. In operation, switching control circuit 110 turns on S1 and S2 alternately, without overlap, to control the state of charge of capacitor C1. The connection of capacitor C1 to switching point 115 allows the negative terminal of capacitor C1 to be switched to Vinput when S1 is turned on (conducting) and switch S2 is off (not conducting). Likewise, the negative terminal of capacitor C1 is switched to ground 130 when S2 is turned on and switch S1 is off.

In FIG. 1, the input voltage 105 (Vinput) charges capacitor C1 through diode D1 to the value of Vinput minus the voltage drop across diode D1 ($V_{D1}$) when switch S2 is closed by action of switching circuit 110. Capacitor C1 is thus charged to Vinput-$V_{D1}$. When switch S2 opens (stops conducting) and switch S1 closes (conducts), the voltage on capacitor C1 is added to Vinput (Vinput+Vinput-$V_{D1}$) and charges output capacitor C2 through diode D2. This charges the output capacitor C2 to an output voltage (Voutput 125) of 2×Vinput-$V_{D1}$-$V_{D2}$. Thus, the output of the charge pump of FIG. 1 is:

$$Voutput=2\times Vinput-V_{D1}-V_{D2}.$$

The above equation includes diode voltage drops $V_{D1}$ and $V_{D2}$. These voltage drops, along the voltage drops across the switches S1 and S2 can be considered minor circuit losses. Given that such losses may be negligible, then an approximation of the Voutput voltage is $$Voutput=2\times Vinput-\text{circuit losses}$$

Or approximately $$Voutput=2\times Vinput$$

However, this output voltage is clearly dependent on the Vinput. If Vinput changes, then Voutput will also change. If Vinput varies, then the charge pump of FIG. 1 will create a variable output of 2Vinput which also varies.

SUMMARY

This summary is provided to introduce a selection of concepts in a simplified form as a prelude to the more detailed description that is presented later. The summary is not intended to identify key or essential features, nor is it intended to delineate the scope of the claimed subject matter.

In an embodiment of the disclosure, a circuit configuration includes a switching regulator having a variable input voltage and a regulated voltage. The switching regulator supplies a switch point that alternates connection between the variable input voltage and ground. A voltage doubler circuit is included that connects to the regulated voltage of the switching regulator to charge a voltage doubler capacitor. The voltage doubler circuit connects to the switch point. The voltage doubler circuit has an output capacitor that receives a charge from the voltage doubler capacitor. The circuit configuration produces an output voltage across the output capacitor. The voltage doubler capacitor is charged from the regulated voltage when the switch point is connected to ground and a voltage on the voltage doubler capacitor is elevated when the switching point is connected to the variable input voltage. The elevated voltage on the voltage doubler capacitor is provided to the output capacitor (C2) to provide the output voltage. The output voltage is twice the variable input voltage plus the regulated voltage minus circuit losses.

In another embodiment of the disclosure, a circuit configuration includes a switching regulator having a variable input voltage and a regulated voltage. The switching regulator supplying a switch point that alternates connection between the variable input voltage and ground. A voltage doubler circuit is included that connects to the regulated voltage of the switching regulator to charge a voltage doubler capacitor, the voltage doubler circuit connecting to the switch point. The voltage doubler circuit having an output capacitor that receives a charge from the voltage doubler capacitor. Also included is a limit circuit connected to the switch point and to the regulated voltage of the switching regulator, the limit circuit connected to the voltage doubler capacitor of the voltage doubler circuit. The limit circuit acts to limit (clamp) a voltage across the voltage doubler capacitor from exceeding the regulated voltage. The circuit configuration producing an output voltage across the output capacitor. The voltage doubler capacitor is charged from the regulated voltage when the switch point is connected to ground, and a voltage on the voltage doubler capacitor is elevated when the switching point is connected to the variable input voltage. The elevated voltage on the voltage doubler capacitor is provided to the output capacitor to provide the output voltage. The output voltage is twice the regulated voltage minus circuit losses. The output voltage remains stable over a range of the variable input voltage.

Additional features and advantages will be made apparent from the following detailed description of illustrative embodiments which proceeds with reference to the accompanying figures. The drawings are for purposes of illustrating the concepts of the disclosure and is not necessarily the only possible configuration for illustrating the disclosure. Features of the various drawings may be combined unless otherwise stated.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the present principles. In the drawings, like numbers represent similar elements.

DETAILED DISCUSSION OF THE EMBODIMENTS

In the following description of various illustrative embodiments, reference is made to the accompanying drawings, which form a part thereof, and in which is shown, by way of illustration, how various embodiments may be practiced. It is to be understood that other embodiments may be utilized and structural and functional modification may be made without departing from the scope of the present principles.

One modification to FIG. 1 can be made by including a readily available switch source for the switching control 110 to drive the switch point 115 (negative terminal of capacitor C1). One switch source is the output of a regulated power supply creating some lower voltage Vreg from the input voltage Vinput. Examples of regulated power supply include DC/DC converters such as buck regulators. These buck regulators include switched synchronous buck regulator types and are commonly used as switching power regulator in many designs for electronic products to create the required local rails from a common DC source that powers the electronic device or product. In one aspect of the disclosure, such a switching power regulator can be used to supply the switch control 110 and switch point 115 for a charge pump voltage doubler.

Figure 2:
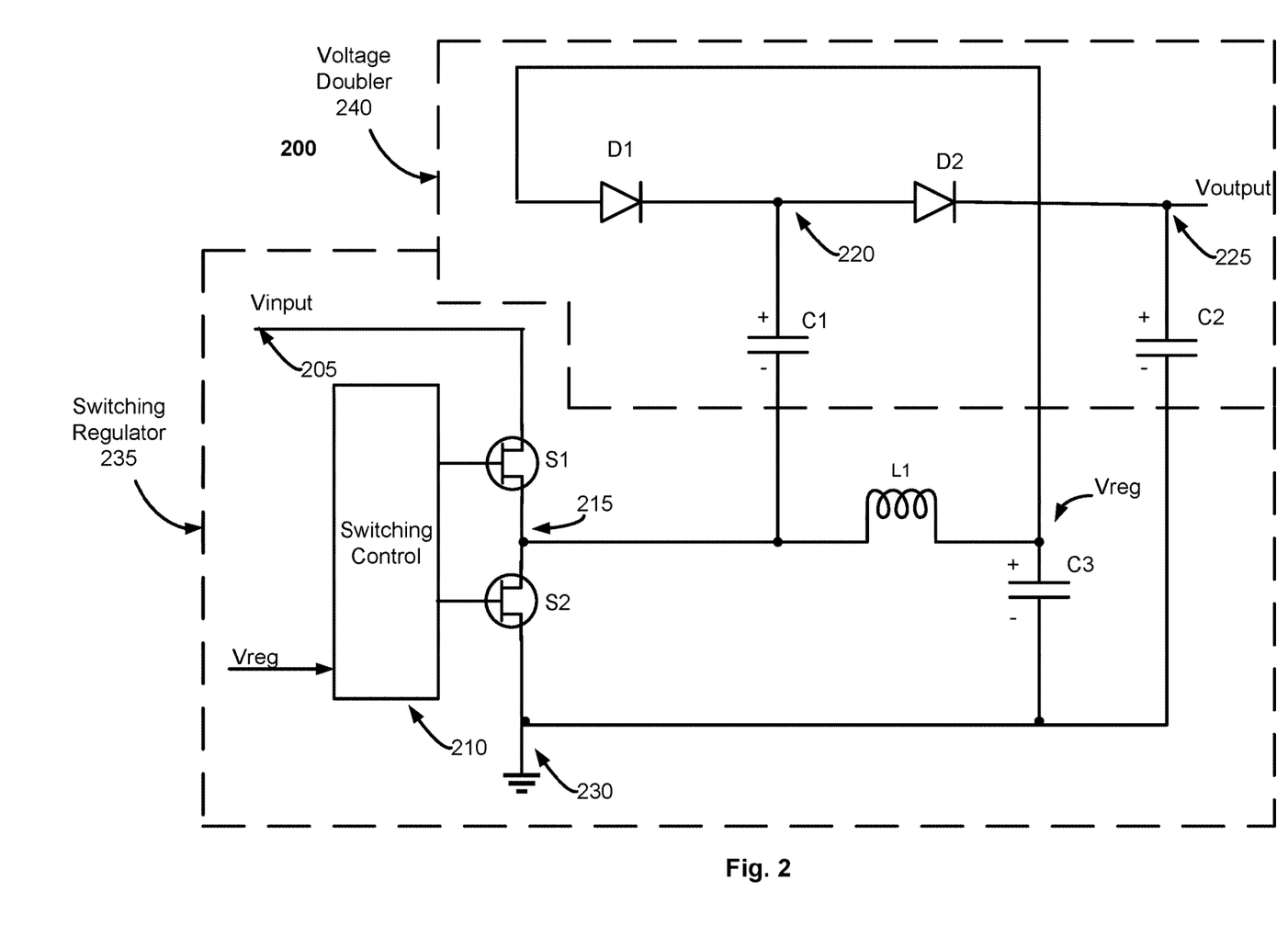
FIG. 2 depicts a voltage doubler circuit topology having aspects of the disclosure.

FIG. 2 depicts a circuit configuration 200 that is a modification of FIG. 1 that uses the switching control circuit 210 of a switching power regulator (switching regulator) to drive a voltage charge pump also known as a voltage doubler. FIG. 2 depicts an embodiment of a voltage doubler 240 connected to a switching regulator 235. The switching regulator block 235 (dotted lines) includes the switching control circuitry 210, switches S1 and S2, inductor L1 and capacitor C3. These items form the power path of the switching regulator. The switching regulator block 235 provides a regulated voltage Vreg at C3. This voltage is used in a feedback loop to stimulate the switching control circuitry 210. The voltage doubler block 240, which may also be referred to as a circuit that increases voltage, includes diodes D1, D2 and capacitors C1 and C2.

In FIG. 2, the switching point 215 (switch node) of the switching regulator 235 is connected to the filter combination of an inductor L1 and capacitor C3. The combination of L1 and C3 connected to the switching point 125 (switch node) may be part of a DC/DC converter (switching regulator) of the buck regulator type of design. Thus, the positive terminal of C3 is a regulated voltage Vreg. The regulated voltage Vreg remains stable over a range of the variable input voltage. The voltage doubler block 240, the circuit that increases voltage, is connected to the switching regulator block 235 at the switching point 215 (switch node) to drive the negative terminal of capacitor C1 and act as a switching source for the voltage doubler block 240. The voltage doubler block 240 is connected to the switching regulator block 235 at the anode of D1 for a source of regulated voltage (Vreg). The output of the voltage doubler block 240 at the negative end of C2 is referenced to ground of the switching regulator block 235. Thus, the circuit that increases voltage 240 is coupled, via the anode of D1, to the output of the regulated voltage (Vreg) of the switching regulator 235. In this instance the coupling is a direct connection from one component to the next. However, in general, the term coupling can include an intermediate or intervening component without loss of clarity to one of skill in the art.

In one embodiment, the switching regulator block 235 may be of the synchronous buck regulator type where the switching duty cycle of S1 and S2 vary according to the load on the buck regulator and the input voltage Vinput. In an example embodiment, input voltage Vinput can vary from 5.25 Volts DC to 13 Volts DC and Vreg is stable at 5 Volts DC within a tolerance over the Vinput range.

In FIG. 2, the anode of D1 of the voltage charge pump function is now connected to a fixed output voltage (Vreg). In one embodiment, the fixed output voltage Vreg is the output of a buck regulator, rather than the input voltage Vinput. In operation, the capacitor C1 is charged via diode D1 when S2 is switched on to connect to ground 230 (i.e. when S1 is also switched off). The designation "C1" is a reference designator, as is a "first capacitor", and does not designate order of importance. C1 charges via a fixed voltage value equal to the output voltage of the switching regulator which is Vreg. The voltage across capacitor C1 is Vreg–$V_{D1}$. When S1 is switched on (i.e. when S2 is also switched off), the negative terminal of capacitor C1 is elevated (raised, increased, or stepped-up in voltage) to Vinput. The switching of S1 to the on state has the effect of stacking (stepping-up) the charge of C1 on top of Vinput. This places the charge on C1 to be Vinput+Vreg–$V_{D1}$. Capacitor C2 charges via diode D2 and receives a voltage pump charge from capacitor C1 when switch S1 is switched on and S2 is switched off. The voltage Vouput at 225 is then added to the voltage stored on capacitor C1 less the diode drop of D2:

$$V\text{output}=(V\text{input}+V\text{reg}-V_{D1})-V_{D2}$$

The above equation includes diode voltage drops $V_{D1}$ and $V_{D2}$. These voltage drops, along the voltage drops across the switches S1 and S2 can be considered minor circuit losses.

Given that such losses may be negligible, then an approximation of the Voutput voltage is $$Voutput = Vinput + Vreg - \text{circuit losses}$$

Or approximately:

$$Voutput = Vinput + Vreg$$

The output voltage Voutput at 225 of the charge pump (voltage doubler block 240) output Voutput is now the sum of Vinput+Vreg (neglecting voltage drops on D1, D2, S1 and S2) where Vinput is still a varying value but Vreg is a fixed value. The varying voltage of Vinput can be further stabilized by the topology of FIG. 3.

Figure 3:
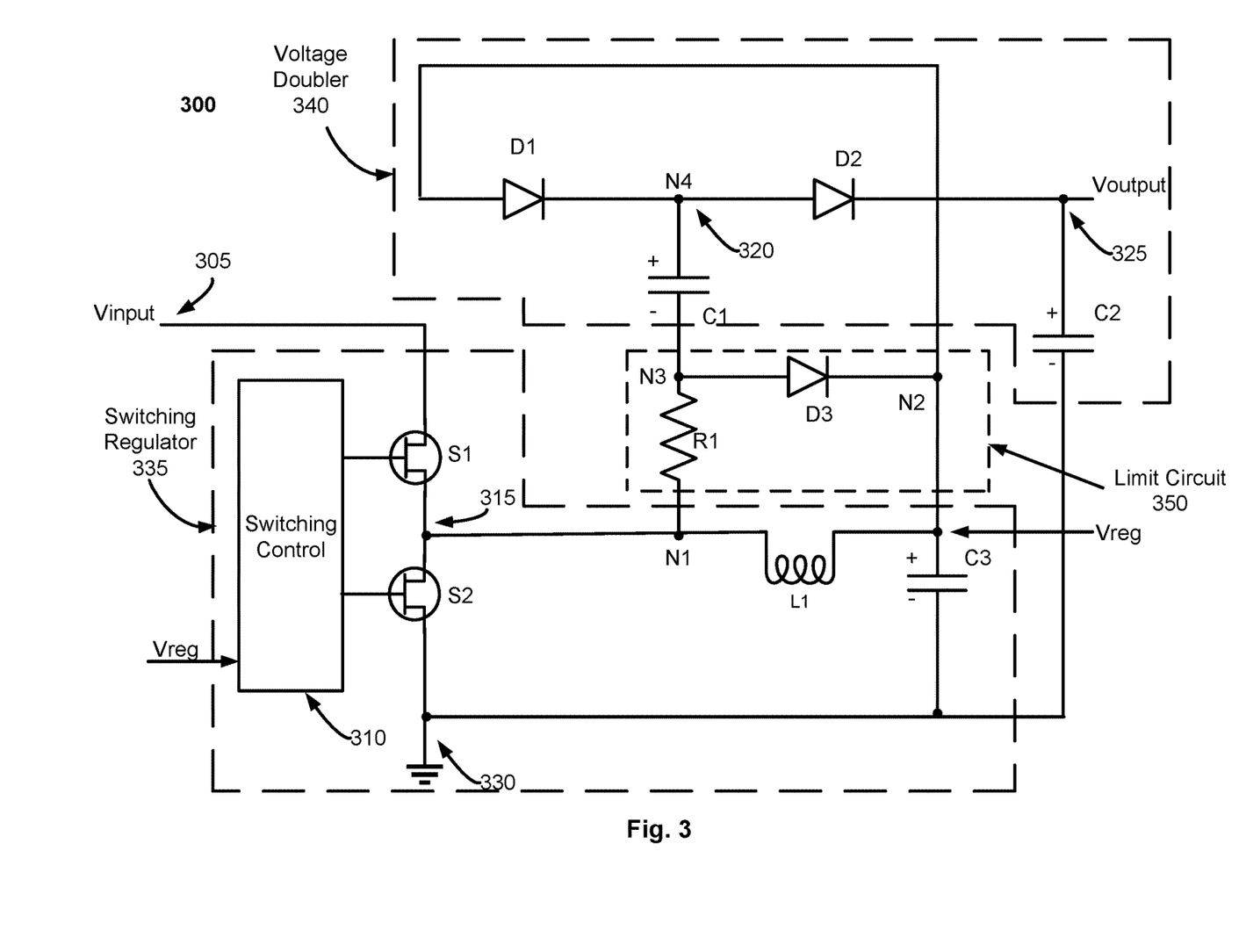
FIG. 3 depicts a voltage doubler circuit topology having a voltage limiting feature according to aspects of the disclosure.

FIG. 3 depicts an embodiment of a circuit topology useful to realize a power converter circuit having a regulated high voltage output that is tolerant of input voltage source variations. FIG. 3 is a circuit configuration 300 or topology that uses a pair of diodes, a pair of capacitors, and a switch point of a switching regulator 335 to create a stable output voltage that is double that of a reference voltage.

The switching regulator block 335 of FIG. 3 includes switching control 310 that controls the duty cycle alternating switching of switches S1 and S2. These switches, which may be semiconductor switches, are used to create regulated voltage output Vreg via the use of filter inductor L1 and capacitor C3. Voltage doubler circuit block 340 (also known as a charge pump) has components that include diodes D1, D2 and voltage doubler capacitor C1 and output capacitor C2. In FIG. 3, resistor R1 and diode D3 are attached to the negative terminal of capacitor C1. This node is identified as N3 in FIG. 3. The addition of R1 and D3 to N3 acts to limit the negative terminal of C1 to Vreg. The combination of R1 and D3 to the configuration 300 is termed a limit circuit, also called a clamp circuit, and is labeled as limit circuit block 350 on FIG. 3.

By adding the resistor R1 and the clamp diode D3 (limit diode D3) to the negative terminal of C1, an electrical clamp (D3) action limits the negative terminal (node N3) of the voltage doubler capacitor (C1) from exceeding the regulated output voltage (Vreg). Thus, node N3 is limited to the value of Vreg (plus a diode drop of D3) when the switch S1 is closed and the node N1 at the switch point 315 of resistor R1 switches to Vinput. As in FIG. 2, the regulated output voltage Vreg remains stable over a range of the variable input voltage. In operation, the capacitor C1 (voltage doubler capacitor) is charged via diode D1 and resistor R1 when S2 is switched on conducting to ground 330 (i.e. S1 is switched off). During this time, voltage doubler capacitor C1 at node N4 is charged via the fixed voltage value of Vreg. The voltage at N4 (positive terminal of capacitor C1 is Vreg−$V_{D1}$−$V_{R1}$. The voltage across R1 becomes negligible when C1 is at full charge. When S2 is switched off (not conducting) and S1 is switched on (conducting to Vinput), the node N1 is elevated in voltage (raised, increased, stacked, or stepped-up in voltage) to a maximum value of Vreg via the clamping action of diode D3. Any voltage at node N3 that is more than Vreg plus the diode voltage drop of D3 is clamped (limited) to that voltage level. Any excess voltage at node N1 compared to node N3 is impressed across R1 and is dissipated. The node N3 is thus limited to a value of Vreg+$V_{D3}$. As such, while switch S1 is on and conducting to Vinput, node N3 elevates the voltage across voltage doubler capacitor C1 to Vreg+$V_{D3}$. The voltage at N4 is (Vreg−$V_{D1}$)+(Vreg+$V_{D3}$) which is 2 Vreg. The voltage at node N4 is used to charge output capacitor C2 at 325 via diode D2 to be the voltage at node N4 minus the voltage drop of D2 which is:

$$Voutput = 2 \times Vreg - V_{D2}$$

The above equation includes diode voltage drop $V_{D2}$. This voltage drop, along the voltage drops across the switches S1 and S2 can be considered minor circuit losses. Given that such losses may be negligible, then an approximation of the Voutput voltage is $$Voutput = 2 \times Vreg - \text{circuit losses}$$

Or approximately $$Voutput = 2 \times Vreg$$

Thus, the output Voutput of the voltage doubler 340 is equal to 2×Vreg. Note that Vreg is a fixed value. There is some power loss in resistor R1 when voltage doubler capacitor C1 is charged and discharged so this is a slightly less efficient charge pump than the one depicted in FIG. 2, but the circuit of FIG. 3 creates a fixed boost voltage, tolerant to variations of Vinput, with just a few passive parts. The output voltage Vout at 325 is not dependent on the variable input voltage Vinput at 305 over the range of Vinput. Such a circuit topology may be used on any power converter device that uses a switching regulator such as a synchronous buck regulator.

The configuration of FIG. 3 may be considered the interconnection of switching regulator block 335, limit block 350, and voltage doubler 340. Limit circuit block 350 is connected between switching regulator block 335 and voltage doubler 340. Limit block 350 is connected to the switching block at the switching node N1 (315) and the regulated output node N2 (Vreg) of the switching regulator block 335. Further, limit circuit block 350 is connected to the voltage doubler block 340 at node N3 and N2 as shown in FIG. 3.

Figure 4:
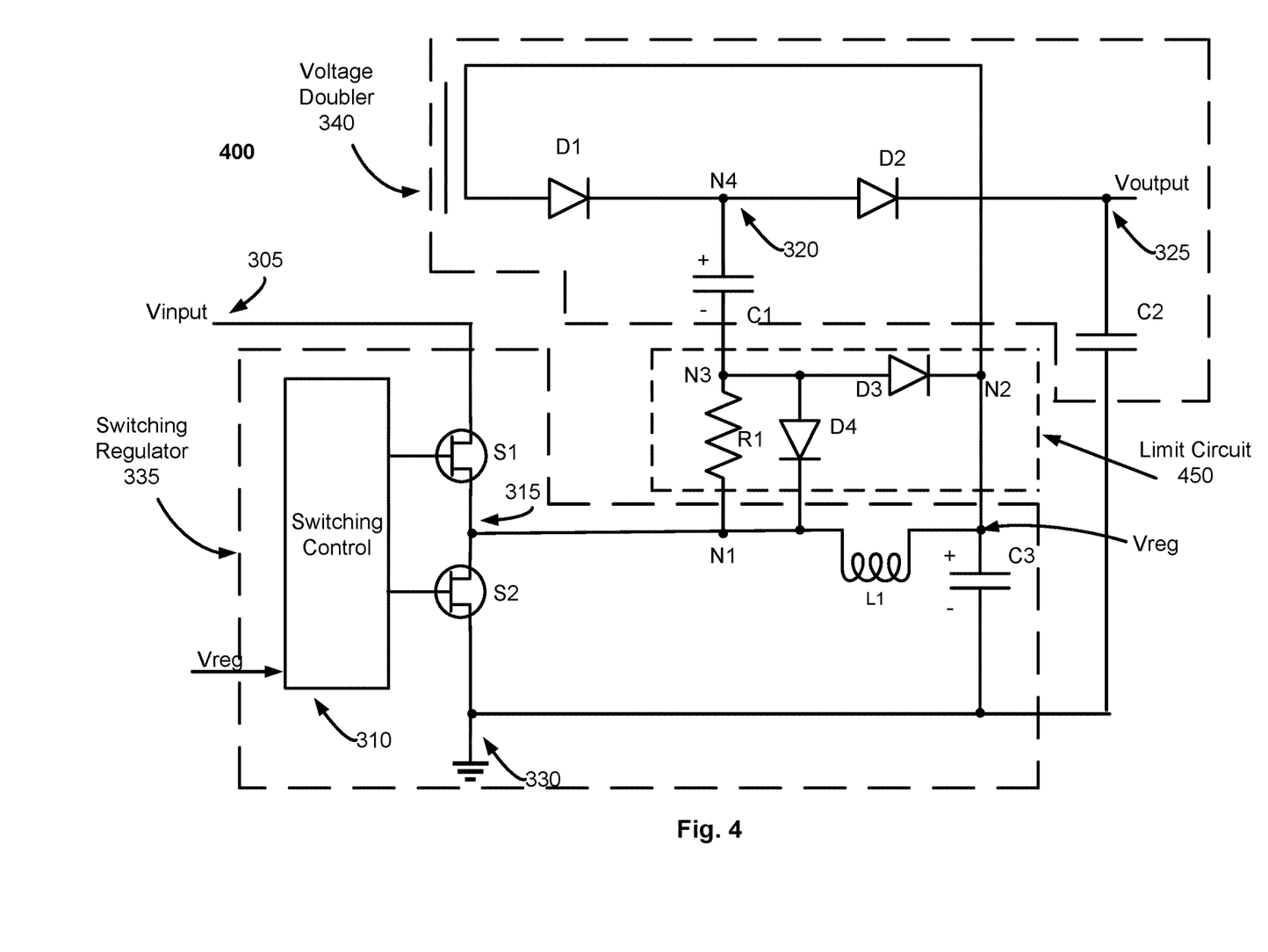
FIG. 4 depicts a voltage doubler circuit topology having a fast charge feature according to aspects of the disclosure.

FIG. 4 represents the circuit topology of FIG. 3 made more efficient with the addition of a diode D4 in parallel to resistor R1 to bypass R1 when the switch S2 is switched on (conducting to ground 330) and voltage doubler capacitor C1 is connected to ground to charge through diode D1.

The configuration of FIG. 4 may be considered the interconnection of switching regulator block 335, modified limit block 450, and voltage doubler 340. Limit circuit block 450 is connected between switching regulator block 335 and voltage doubler 340. Limit block 450 is connected to the switching block at the switching node N1 (315) and the regulated output node N2 (Vreg) of the switching regulator block 335. Further, limit circuit block 450 is connected to the voltage doubler block 340 at node N3 and N2 as shown in FIG. 4. Diode D4 is connected across resistor R1 with the anode on node N3 and the cathode at on N1. The addition of D4 speeds up the charging of C1 when switch S2 is on and conducting to ground 330. This can allow ample charging time of C1 if the duty cycle of S2 becomes small restricting the on (conducting) time duration.

In one embodiment, the values for the components of the circuit of FIGS. 3 and 4 are:
- C1: 0.1 uf~1 uF depending on switch frequency and load at Voutput.
- C2: 0.1 uf~1 uF depending on switch frequency and load at Voutput.
- C3: Part of existing Buck regulator circuit, may be any value.

R1: 1K~10K depending on switch frequency and load at Voutput.

L1: Part of existing Buck regulator circuit, may be any value.

D1-D4: BAT54 or equivalent

Figure 5:
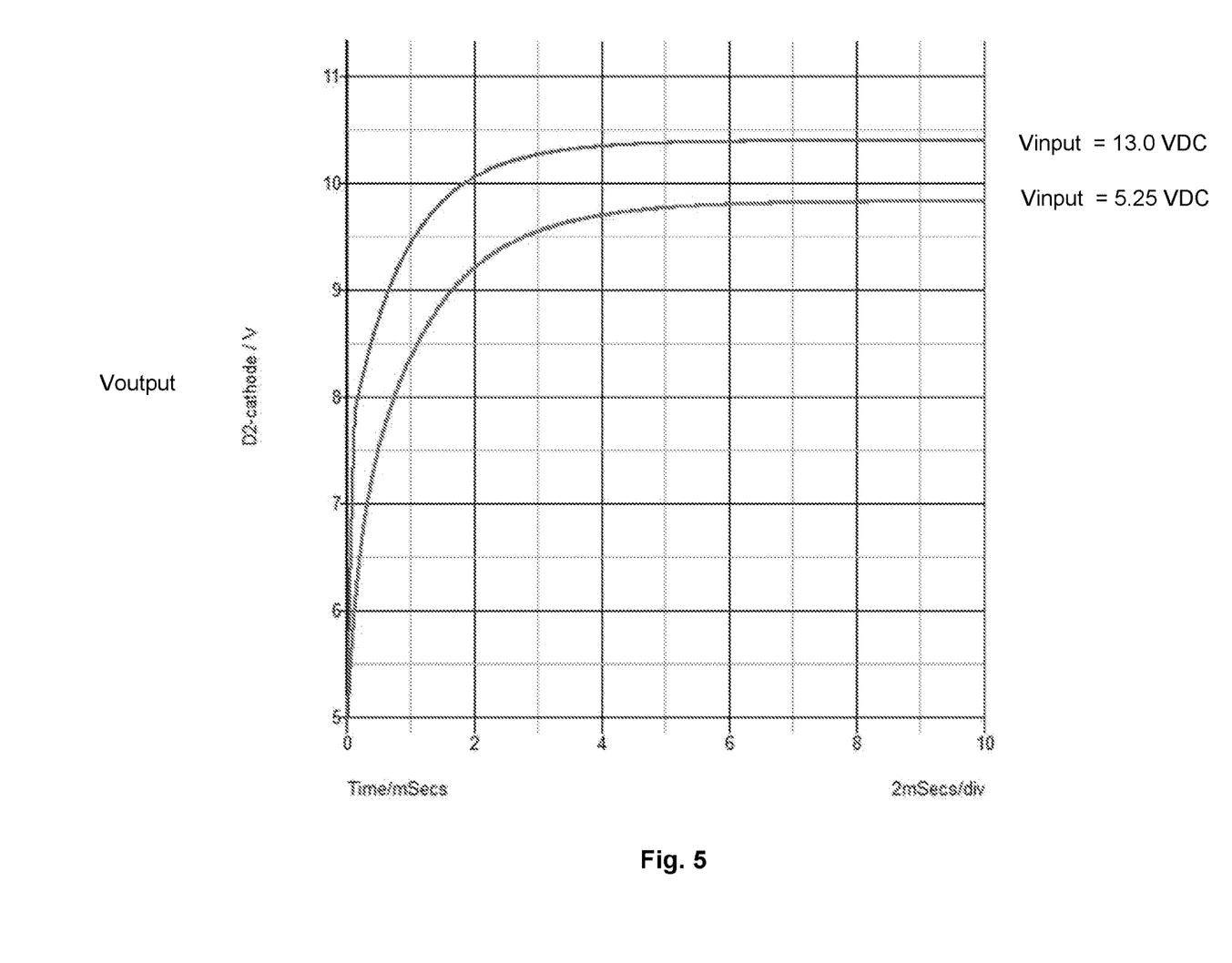
FIG. 5 depicts typical electrical response features of the disclosed circuit topology.

Diodes D1, D2, D3, and D4 can be similar and selected for low forward bias voltage drop, such as a Schottky diode. Switches S1 and S2 may be part of a switching regulator, as are C3 and L1. S1 and S2 may represent any suitable switch, such as a bipolar or FET type switch as discussed above. FIG. 5 depicts a Voutput response of the circuit of FIG. 3 with Vinput at two different levels; one at 13 Volts DC, one at 5.25 Volts DC representing the range of input voltage. In these results, the Vreg is approximately 5 Volts DC. The results confirm that the Voutput of the voltage doubler circuit of FIG. 3 can be reasonably stable over a wide input range. In this embodiment, the nominal Voutput is 10 VDC, which is 2 Vreg.

Figure 6:
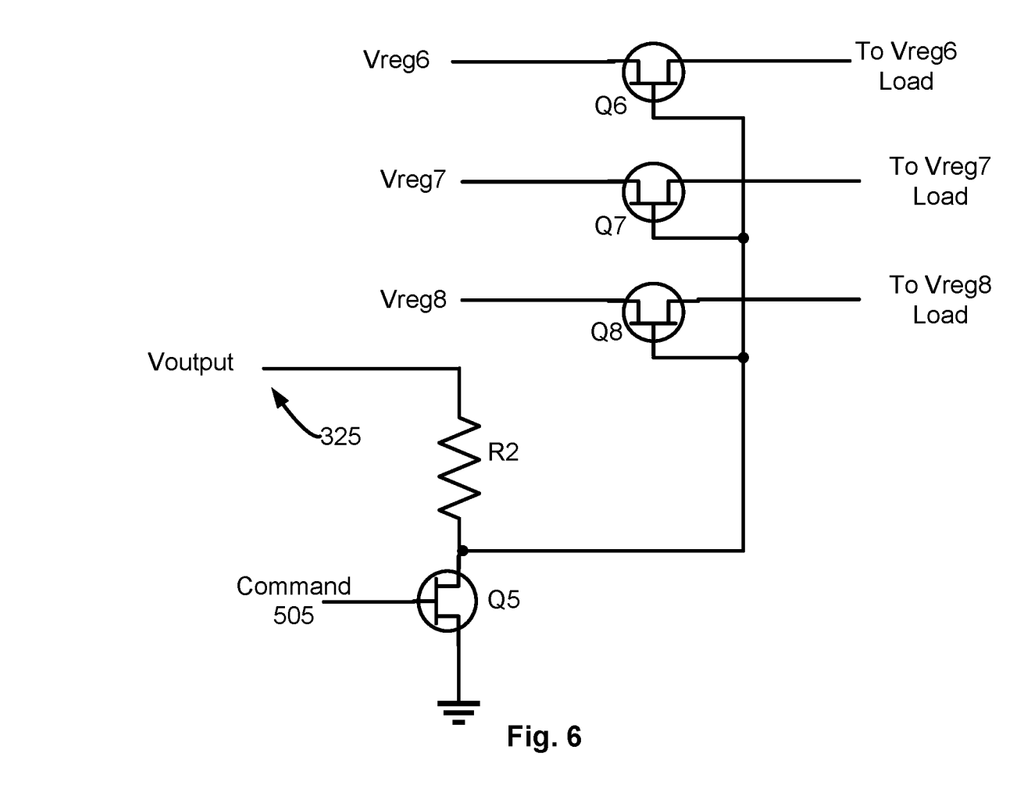
FIG. 6 depicts a typical application of the disclosed voltage doubler circuit.

FIG. 6 depicts one embodiment of a utilization of the circuits of FIGS. 3 and 4. In this application, the high output voltage Voutput is utilized to supply appropriately high bias voltage to a control/command circuit used to power on or off multiple regulated outputs of a DC power supply. As shown, Vreg6, Vreg7, and Vreg8 are regulated DC voltage outputs from a power converter. Series Pass transistors Q6, Q7, and Q8 pass the regulated voltages to their respective loads. Voutput is applied to a resistor R2, typically a large value resistor, so as not to draw much current when transistor Q5 is turned on via command 505. As such when the command line is such that transistor Q5 is turned off, the gates of transistors Q6-Q8 are held biased high to keep the series pass transistors Q6-Q8 turned on and supplying current to the respective loads. When a command line 505 is such that it turns on Q5 to conduct to ground, then the gates of series pass transistors turn off the series pass transistors and thus their respective loads. FIG. 5 is one typical application for a high voltage doubler circuit with a stable Voutput that can be utilized in a multiple output power supply application.

The configuration disclosed herein is useful to realize a power converter circuit having a regulated high voltage output that is tolerant of input voltage source variations. One advantage of the configuration of FIG. 2 is that a switching regulator is added to a voltage doubler circuit and is used to (a) produce a regulated voltage to be used to drive the voltage doubler and (b) the switching circuit of the switching regulator is used to drive the switching input of the voltage doubler. The circuit configuration of FIG. 3 further has the advantage of (c) a limiter circuit added to establish a fixed and stable output voltage for a varying range of input voltages. The circuit configuration of FIG. 4 has the advantage of a bypass diode D4 which allows a faster charging time for the voltage doubler capacitor. All three configurations can be used in any electronic device, such as a set-top box, gateway, television, media players, portable or mobile devices, and the like.

The above disclosure addresses a circuit configuration including a switching regulator block having a variable input voltage and a regulated voltage and a voltage doubler circuit block that utilizes the regulated voltage of the switching regulator. The voltage doubler circuit block includes an output capacitor that receives a voltage pump charge from a voltage doubler capacitor. An electrical clamp limits the voltage doubler capacitor from exceeding the regulated voltage. The circuit configuration produces an output voltage that is twice the regulated voltage. The regulated voltage remains stable over a range of the variable input voltage and the output voltage is not dependent on the variable input voltage over the range of the variable input voltage. In an embodiment of the circuit configuration, the switching regulator is a DC to DC converter or a synchronous buck regulator power supply.

As described above, a voltage doubler circuit configuration includes a circuit having a first node that is alternately switched between ground and an input voltage, the first node connected from a switching regulator, and a second node having a regulated voltage, the regulated voltage comprising an output of the switching regulator. A resistor is connected to the first node, the resistor is connected in series to a first capacitor at a third node, and the first capacitor arranged in series with a cathode of a first diode at a fourth node. The first capacitor charges from the regulated voltage through the first diode and the resistor when the first node is switched to ground. A third diode is connected between the third node and the second node to the regulated voltage, an anode of the third diode is connected to the third node, and an anode of a second diode is connected at the fourth node to the first capacitor. An output capacitor is connected to a cathode of the second diode at an output node having an output voltage. The output capacitor charges through the second diode from the first capacitor when the first node is switched to the input voltage, the third diode acts as a clamp to limit a voltage at the third node to be no more than the regulated voltage. The output voltage of the voltage doubler output capacitor is double the regulated voltage over a range of the input voltage of the switching regulator.

In some aspects of the disclosure, the first node is a switching node of the switching regulator 335. The third node is the negative terminal of the first capacitor. An anode of the first diode is connected to the regulated voltage enabling the first capacitor to charge from the regulated voltage through the first diode and the resistor when the first node is switched to ground. The third diode has an anode connected to the third node and whose cathode is connected to the fourth node having the regulated voltage. The first node is switched to the input voltage, the negative terminal of the first capacitor at the third node rises to no more than the regulated voltage within the range of values of the input voltage. The output voltage on the output capacitor is double the regulated voltage. A filter inductor of the switching regulator is positioned between the first node and the second node. A fourth diode is positioned in parallel to the resistor with an anode of the fourth diode located at the third node.

The above disclosure also describes an apparatus having a regulator including an input for a variable input voltage and an output of a regulated voltage. The regulator may be implemented as a switching regulator. The switching regulator including a switch node that is configured to alternate connection between the input for the variable input voltage and ground. A circuit that increases voltage is coupled to the output of the regulated voltage of the switching regulator to charge a first capacitor. The circuit is coupled to the switch node. The circuit includes an output capacitor that receives a charge from the first capacitor. The apparatus producing an output voltage across the output capacitor.

In one embodiment, the first capacitor is configured to be charged from the regulated voltage when the switch node is coupled to ground and a voltage on the first capacitor is configured to be stepped-up when the switch node is coupled to the input for the variable input voltage. The stepped-up voltage on the first capacitor is configured to be provided to the output capacitor to provide the output voltage. The output voltage is configured to be substantially twice the variable input voltage plus the regulated voltage minus circuit losses.

In one embodiment, a limit circuit coupled to the switch node and to the regulated voltage of the switching regulator. The limit circuit coupled to the first capacitor of the circuit such that the limit circuit limits a voltage across the first capacitor from exceeding the regulated voltage. The first capacitor is charged from the regulated voltage when the switch node is coupled to ground, and a voltage on the first capacitor is stepped-up when the switch node is coupled to the variable input voltage. The stepped-up voltage on the first capacitor is provided to the output capacitor to provide the output voltage. As such, the output voltage is twice the regulated voltage minus circuit losses. The output voltage remains stable over a range of the variable input voltage.

In the above embodiments, the switching regulator is a DC to DC converter. In one embodiment, the limit circuit can be configured for faster charging of the first capacitor when the switch node is coupled to ground.

The embodiments above may be found in an electronic device, such as in a set-top box, a gateway, a television, mobile devices, and the like. Examples of mobile devices include cellular telephones, PDAs, laptops, and the like.

The invention claimed is:

1. An apparatus comprising:
   a regulator including an input for a variable input voltage and an output of a regulated voltage, the regulator including a switch node that is configured to alternate connection between the input for the variable input voltage and ground;
   a circuit that increases voltage, the circuit being coupled to the output of the regulated voltage of the regulator to charge a first capacitor, the circuit being coupled to the switch node, and the circuit including an output capacitor that receives a charge from the first capacitor, the apparatus producing an output voltage across the output capacitor; and
   a limit circuit coupled to the switch node and to the regulated voltage of the regulator, the limit circuit coupled to the first capacitor of the circuit;
   wherein the limit circuit comprises a resistor and a clamp diode arranged such that the resistor is connected between the switch node and a negative terminal of the first capacitor, and an anode of the clamp diode is connected to the resistor connection at the negative terminal of the first capacitor and a cathode of the clamp diode is connected to the regulated voltage of the regulator; and
   wherein the limit circuit limits a voltage across the first capacitor from exceeding the regulated voltage.

2. The apparatus of claim 1, wherein the first capacitor is configured to be charged from the regulated voltage when the switch node is coupled to ground, and a voltage on the first capacitor is configured to be stepped-up when the switch node is coupled to the input for the variable input voltage.

3. The apparatus of claim 2, wherein the stepped-up voltage on the first capacitor is configured to be provided to the output capacitor to provide the output voltage.

4. The apparatus of claim 1, wherein the output voltage is configured to be substantially twice the variable input voltage plus the regulated voltage minus circuit losses.

5. The apparatus of claim 1, wherein the output voltage remains stable over a range of the variable input voltage.

6. The apparatus of claim 1, wherein the regulator is a DC to DC converter.

7. The apparatus of claim 1, wherein the limit circuit is further configured for fast charging of the first capacitor when a bypass component bypasses the resistor when the switch node is coupled to ground.

8. The apparatus of claim 1, wherein the apparatus is an electronic device comprising a set-top box, gateway, television, or mobile device.

9. The apparatus of claim 1, wherein the limit circuit comprises a resistor and a clamp diode.

* * * * *